Feb. 22, 1955
H. V. DAVIES
2,702,617
PARTICLE TYPE COUPLING
Filed May 1, 1951
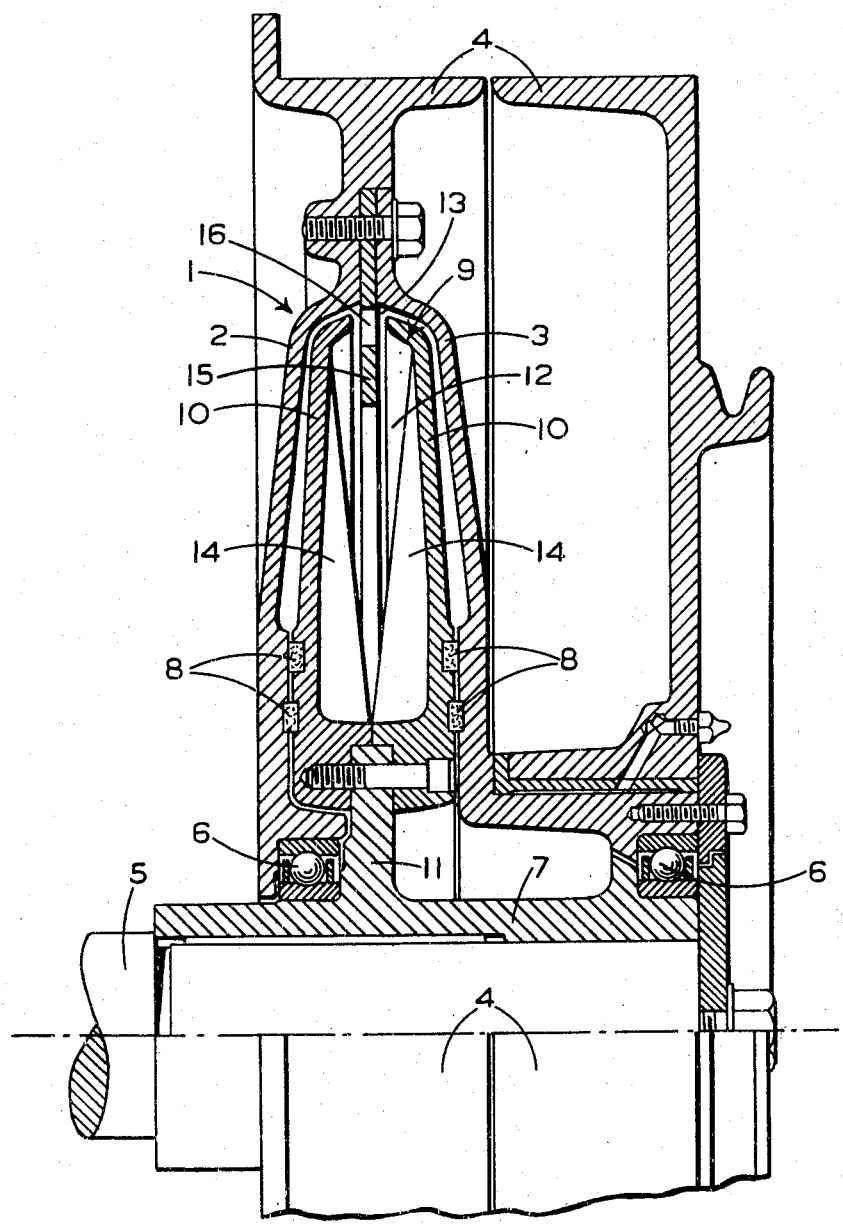
Inventor:-
Hubert Victor Davies
per:-
*Babcock & Babcock*
Attorneys

United States Patent Office 2,702,617
Patented Feb. 22, 1955

2,702,617

PARTICLE TYPE COUPLING

Hubert Victor Davies, London, England

Application May 1, 1951, Serial No. 223,856

1 Claim. (Cl. 192—58)

This invention has reference to transmission couplings of the kind wherein a rotatable casing encloses a co-axial rotor, a drive transmitting medium or intermediary in the form of powder or similarly granulated metallic or non-metallic material being provided within the casing for effecting a drive from one member to the other, the casing being usually the driving member and the rotor the driven member, so that the action is such that the coupling slips at low speed but effects a substantially non-slip drive at higher or working speeds.

The object of the present invention is to provide an improved coupling of the kind referred to whereby a better starting torque can be obtained so that the coupling can commence to transmit a drive under heavy load without excessive initial slip and further whereby an increased rate of acceleration of the transmitted drive is also obtained.

In order that the invention may be clearly understood and readily carried into practical effect, reference is made in the following description to the accompanying drawing, which is a part axial plane section of a coupling of the kind referred to and in accordance with the present invention.

Referring to the drawing, the driving member consists of a casing 1 formed from two halves 2, 3 secured together, the half of the casing 2 having formed integral therewith part of a driving pulley assembly 4 in the particular example shown.

The casing 1 is free to rotate about the driven shaft 5 on ball bearings 6, 6 mounted on a hub member 7 fast with the shaft 5, sealing washers 8, 8 of felt or the like being provided to seal the ball bearings 6, 6 from the interior of the casing.

The interior of the casing 1 closely follows the outer contour of the rotor 9 which latter is built up of two dished circular members 10, 10 internally re-inforced by radial webs 14 and secured to the hub 7 by means of the annular web 11 thereof so as to be fast with the driven shaft 5, the dished members 10 being arranged opposite one another so as to form a hollow interior 12 within the rotor.

A gap 13 is left between the mutually and outwardly inclined outer peripheral edges of the members 10 so as to provide a peripheral aperture forming the sole communication between the hollow interior 12 and the interior of the casing 1, which aperture extends in an endless manner around the entire periphery of the rotor 9 and is considerably narrower than the hollow interior 12.

In accordance with this invention the inner periphery of the casing 1 is provided with an internal projection in the form of a tongue 15 which enters the hollow interior 12 of the rotor 9 through the gap 13 in the periphery of the latter, the said tongue extending within the rotor for only a short distance relative to the internal diameter of said rotor.

The tongue 15 is of annular form around the entire inner periphery of the casing, and as shown, may be in the form of a ring or ring segments bolted in position between the two halves 2, 3 of the casing, the tongue being so positioned as to have a clearance fit in the gap 13 such that there is no actual contact of the tongue with the rotor.

The casing 1 and also the hollow interior 12 of the rotor 9 are filled with powdered or granulated metallic or non-metallic material, the hollow interior 12 thus serving to accommodate some of the powder or the like within the coupling whilst the action of the coupling is as follows:

Upon the outer casing being rotated slowly substantially no drive is imparted to the rotor 9 but on increased speed owing to the friction created by the powder the rotor 9 commences to rotate or to rotate at a speed nearer to that of the casing 1. It is at this stage that the tongue 15 according to this invention serves the purpose of increasing the area for frictional contact for the powder between the casing and the rotor in the vicinity of the periphery of the latter, so initiating rotation of said rotor particularly when the shaft 5 is under heavy load.

As the rotor gathers speed (which acceleration is improved by the action of the tongue 15) and owing to centrifugal force, some powder is expelled from the hollow interior 12 within said rotor via the gap 13 to be impacted between the mutually inclined peripheral surfaces of the rotor and tongue 15 and adjacent inner peripheral wall of the casing 1 of complementary form, said inclined surfaces assisting the impacting of the powder by centrifugal force. When this state of affairs is obtained a substantially solid drive is effected between the casing and rotor with the very minimum of slip.

The surfaces of the tongue 15 within the casing 1 may be provided with irregularities which can be in the form of depressions or, as shown, take the form of a series of holes or openings 16 preferably equi-spaced around the tongue for the purpose of increasing the frictional engagement of the latter with the powder.

Upon the speed of the casing being reduced from working speed to idling speed, some powder returns to the hollow interior 12 of the rotor 9 by falling through the peripheral gap 13 in the latter so that a condition of impacted powder between the rotor 9 and the casing 1 breaks down, and also owing to the reduced effective weight of powder in the coupling a maximum degree of slip is obtained in the drive transmitted thereby.

The powder employed is preferably metallic e. g. iron of a mesh of 100 and it has been found beneficial to include in the weight of powder from 5 to 10% of graphite to act as a lubricant, the amount of graphite being varied in accordance with the particular application of the coupling. Thus where a long slow slip is required it is advisable to have a higher percentage of graphite and conversely where short sharp drives are required the percentage of graphite is lower.

Throughout the foregoing the casing 1 has been referred to as the driving member, but it is to be understood that the rotor 9 can be employed as the driving member for driving the casing 1 as desired or convenient, the drive transmitted having similar characteristics to that above described.

I claim:

A transmission coupling of the character described comprising a rotatable casing having mutually inclined inner peripheral surfaces; a drive transmitting medium in the form of powder contained in said casing; a rotor co-axially mounted for rotation in said casing, said rotor having an external contour closely following that of the interior of the casing in a complementary manner and being formed from two dished circular members mounted fast with one another for rotation together with their dished sides opposed to form an annular hollow interior within the rotor for accommodating some of the powder, the outer peripheral surfaces of the dished circular members being mutually inclined towards a peripheral apex of the rotor to closely correspond with the mutually inclined inner periphery surfaces of the casing, whilst outer peripheral edges of said dished circular members at said apex having a gap therebetween, said gap providing an endless peripheral aperture around said peripheral apex of the rotor which aperture is narrower relative to the hollow interior of the rotor and forms the sole communication between said hollow interior and the casing for expulsion of powder from said annular hollow interior into the casing by centrifugal force; and an annular tongue carried by said casing and extending in an endless manner around the inner periphery of the latter, which tongue enters with clearance the annular hollow interior of the rotor through the endless peripheral aperture thereof, and extends within the rotor for only a short distance relative to the internal diameter of said rotor.

References Cited in the file of this patent

UNITED STATES PATENTS

| | | |
|---|---|---|
| 1,228,215 | Junkers | Mar. 29, 1917 |
| 1,848,616 | Fottinger | Mar. 8, 1932 |
| 1,887,610 | Widegren et al. | Nov. 15, 1932 |
| 1,903,943 | Rudquist | Apr. 18, 1933 |
| 2,342,414 | Magill | Feb. 22, 1944 |

FOREIGN PATENTS

| | | |
|---|---|---|
| 400,882 | Great Britain | 1933 |
| 249,295 | Switzerland | Apr. 1, 1948 |